United States Patent [19]
Kanazawa et al.

[11] Patent Number: 5,257,145
[45] Date of Patent: Oct. 26, 1993

[54] OPTICAL DATA RECORDING AND REPRODUCING APPARATUS

[75] Inventors: Hiroshi Kanazawa; Isao Okuda; Shinpei Shinozaki; Suguru Takishima, all of Tokyo, Japan

[73] Assignee: Asahi Kogaku Kogyo Kabushiki Kaisha, Tokyo, Japan

[21] Appl. No.: 928,313

[22] Filed: Aug. 12, 1992

[30] Foreign Application Priority Data

Aug. 13, 1991 [JP] Japan .................. 3-71536[U]

[51] Int. Cl.$^5$ ........................................... G02B 7/02
[52] U.S. Cl. ...................... 359/819; 359/811; 359/822
[58] Field of Search ............... 359/819, 820, 822, 823, 359/824, 811, 813, 814; 369/44.15, 44.16, 44.22

[56] References Cited

U.S. PATENT DOCUMENTS

| | | | |
|---|---|---|---|
| 4,088,396 | 5/1978 | Edelstein | 359/822 |
| 4,655,548 | 4/1987 | Jue | 359/811 |
| 4,668,047 | 5/1987 | Okura | 359/819 |
| 4,969,715 | 11/1990 | Nishihara et al. | 359/813 |
| 5,068,844 | 11/1991 | Tanaka | 369/44.16 |
| 5,103,438 | 4/1992 | Masunaga et al. | 369/44.22 |

FOREIGN PATENT DOCUMENTS 8404991 12/1984 World Int. Prop. O. .

OTHER PUBLICATIONS

English Language Abstract of WIPO—Dec. 20, 1984.

*Primary Examiner*—Loha Ben
*Attorney, Agent, or Firm*—Sandler Greenblum & Bernstein

[57] ABSTRACT

An optical data recording and reproducing apparatus including an objective lens for converging light onto an optical disc, and a lens holder which supports the objective lens. The lens holder has a circular opening and a lens holding surface provided on a periphery of the circular opening. One of either the objective lens or the lens holding surface of the lens holder has a symmetrical tapered surface which is adapted to come into contact with the other of either the lens holding surface or objective lens, respectively.

16 Claims, 4 Drawing Sheets

OPTICAL DATA RECORDING AND REPRODUCING APPARATUS

BACKGROUND OF THE INVENTION

1. Field of the Invention

The present invention relates to an optical data recording and reproducing apparatus (i.e., an optical disc apparatus) which records and reproduces optical data onto and from a recording medium, such as an optical disc or a photomagnetic disc. More precisely, it relates to an optical head (i.e., a carriage) which is moved across data recording tracks which lie in the circumferential direction of the optical disc.

2. Description of Related Art

Generally speaking, an optical disc apparatus has a carriage which is movable in the radial direction of the optical disc and which holds a reflecting mirror thereon for reflecting light (i.e., a laser) emitted from a stationary optical system in the radial direction of the optical disc towards an objective lens, which is held by a lens holder. The objective lens is supported on the lens holder by a holding flange which is provided on the outer circumference of the objective lens and perpendicular to the optical axis thereof, and an annular supporting surface which is provided on the lens holder to support the holding flange of the objective lens. The annular supporting surface of the lens holder has a center circular opening where the objective lens is placed. However, in known supporting mechanisms as mentioned above, the holding flange of the objective lens and the annular supporting surface of the lens holder are made flat, the flat surfaces being perpendicular with respect to the optical axis (i.e., the design optical axis). Accordingly, the position of the objective lens can be adjusted only in a direction perpendicular to the optical axis within a limit defined by the difference in diameter between center circular opening of the lens holder and the objective lens.

Due to the possibility in a manufacturing error of the lens holder or carriage, the annular supporting surface of the lens holder may not be normal to the design optical axis. There is a further possibility that the optical axis of the objective lens may be inclined or deviated from the design optical axis due to a manufacturing error of the holding flange of the objective lens.

To correct the inclination or deviation of the optical axis of the objective lens with respect to the design optical axis, the lens holder or carriage is usually provided with an adjusting mechanism. However, such an adjusting mechanism is bulky and complex in construction, resulting in a heavy and complicated movable optical system, as a whole.

SUMMARY OF THE INVENTION

The primary object of the present invention is to provide an optical disc apparatus having a simple, small and light carriage with an objective lens whose optical axis can be easily adjusted to be made coincident with the design optical axis.

To achieve the object mentioned above, according to an aspect of the present invention, an optical data recording and reproducing apparatus is provided comprising an objective lens for converging light onto an optical disc, and a lens holder which supports the objective lens. The lens holder has a circular opening and a lens holding surface provided on a periphery of the circular opening. One of either the objective lens or the lens holding surface of the lens holder has a symmetrical tapered surface which comes into contact with the other of either the lens holding surface or objective lens, respectively. A center axis defined by the large and small circular openings of the symmetrical tapered surface is coincident with the design optical axis of the objective lens.

According to another aspect of the present invention, there is provided an optical data recording and reproducing apparatus comprising an objective lens for converging light onto an optical disc, and a lens holder which supports the objective lens. The lens holder has a circular opening and a lens holding surface provided on a periphery of the circular opening. The objective lens or lens holding surface of the lens holder is provided with a conical or spherical surface on which the axial position of the objective lens can be adjusted with respect to the lens holder.

According to yet another aspect of the present invention, an optical data recording and reproducing apparatus comprises a carriage which is movable across data recording tracks formed on an optical disc, in the circumferential direction thereof. The carriage supports an objective lens to converge light onto the optical disc to form an image. At least one of either an outer peripheral surface of the objective lens or an inner peripheral edge of a circular opening formed in the carriage is conical or spherical, so that the other of either an inner peripheral edge of the circular opening or the outer peripheral surface of the objective lens comes into contact with the conical or spherical surface, respectively.

According to still another aspect of the present invention, in an optical data recording and reproducing apparatus comprising an objective lens which converges light onto an optical disc, and a lens holder which has an opening in which the objective lens is held, means are provided for connecting the objective lens to the opening of the lens holder, and means for adjusting the position of the objective lens with respect to the lens holder.

The present disclosure relates to subject matter contained in Japanese utility model application No. 3-71536 (filed on Aug. 13, 1991), which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENTS

Figure 3:
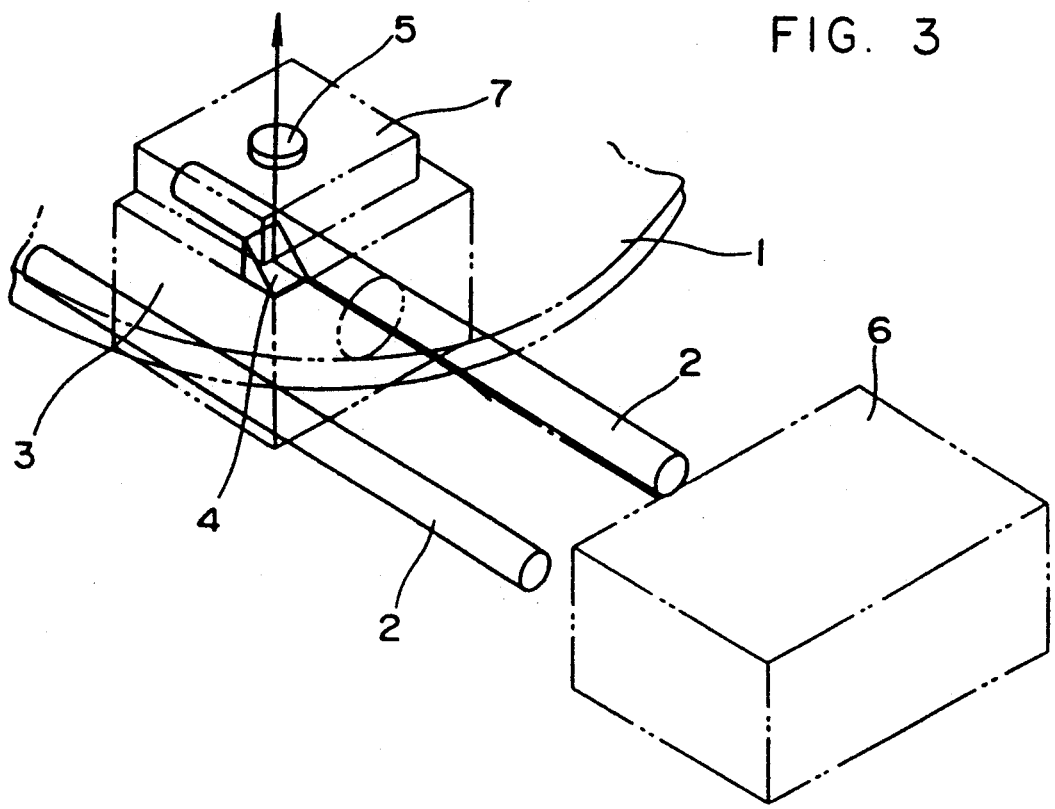
FIG. 3 is a perspective view of an optical head to which the present invention is applied.
Figure 4:
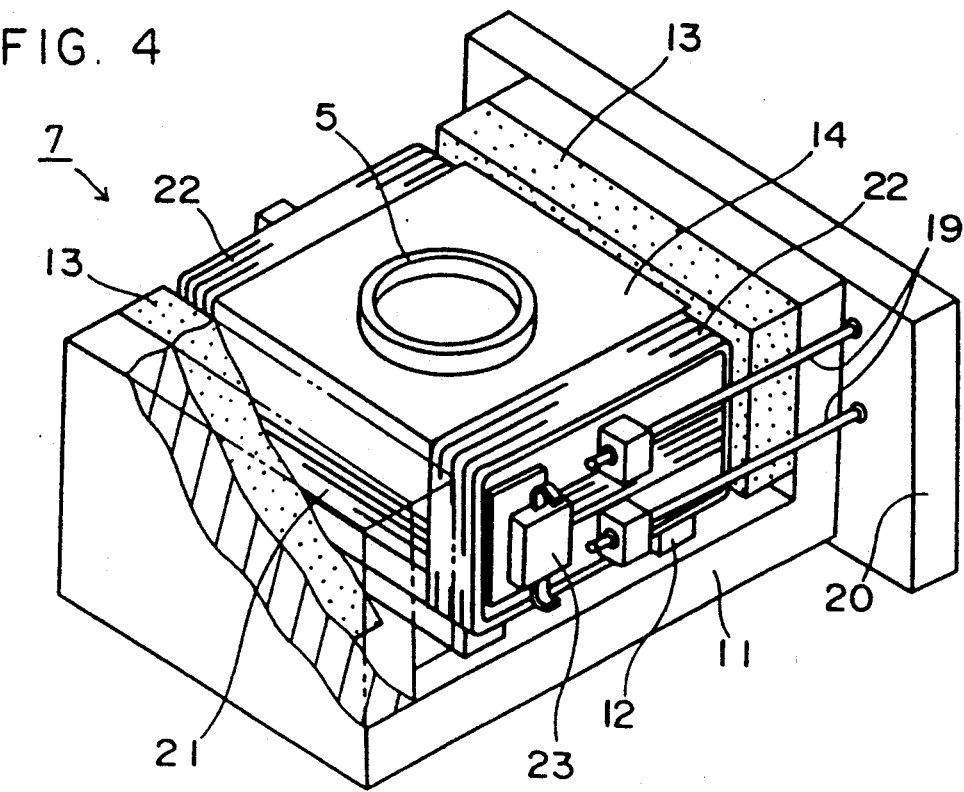
FIG. 4 is a perspective view of a fine adjustment actuator according to the present invention.
Figure 5:
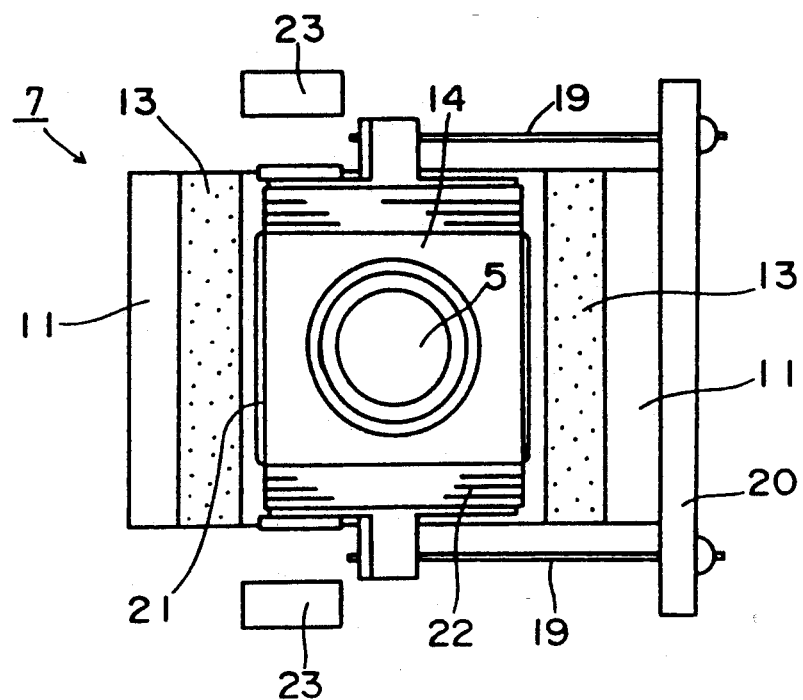
FIGS. 5 and 6 are a plan view and a front elevational view of the fine adjustment actuator shown in FIG. 4, respectively.
Figure 6:
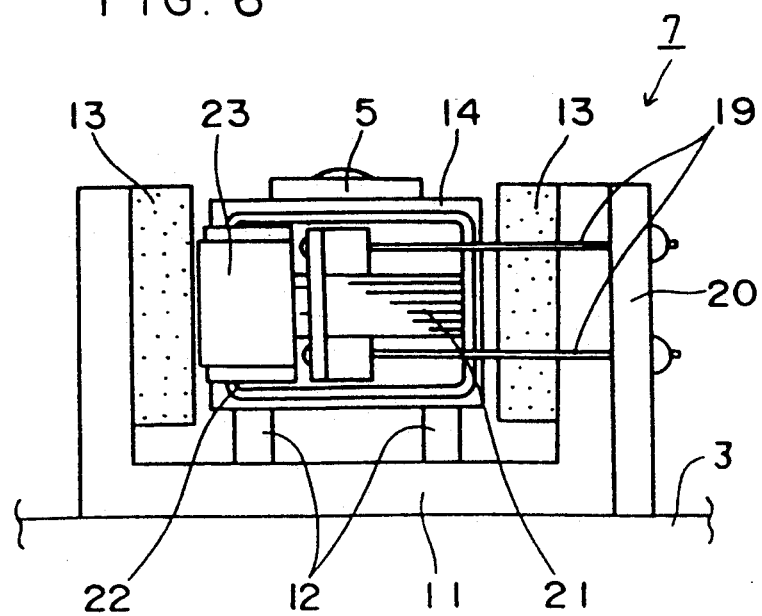

As can be seen in FIG. 3, a pair of guide rails 2 are provided below the lower surface of an optical disc 1 and extend in the radial direction of the optical disc 1, so that a carriage 3 is movable on and along the guide rails 2. The carriage 3 supports a prism 4 which constitutes a reflecting means to perpendicularly reflect light emitted from a stationary optical system 6. The carriage 3 is also provided with a fine adjustment actuator 7 which supports an objective lens 5. The objective lens 5 converges light reflected by the prism 4 onto the optical disc 1 to form an image.

Fine adjustment actuator 7 includes a yoke assembly having a generally U-shaped outer yoke 11 and two inner yokes 12 located between the outer yoke 11. The yoke assembly which is secured to the upper surface of the carriage 3 is provided with a window (not shown) through which light reflected by the prism 4 is transmitted. The yoke assembly defines magnetic fields together with magnets 13 held on the inner walls of the side plates of the outer yoke 11 between the outer yoke 11 and the associated inner yokes 12.

A lens holder 14, which is in the form of a generally inverted U-shaped housing, in section, is loosely fitted on the inner yokes 12. The lens holder 14 is provided on the inner wall thereof with holes or grooves 15, in which the inner yokes 12 are fitted, and on the upper center surface thereof with a circular opening 16 through which the light reflected by the reflecting mirror (prism) 4 is transmitted. The objective lens 5 is secured to the peripheral edge of the center opening 16 by means of an adhesive 17.

Objective lens 5 is provided on the outer peripheral edge thereof with a thick holding flange 5a integral therewith. The vertical surface on the outer periphery of holding flange 5a is substantially parallel to the optical axis 0 of the objective lens 5. The objective lens 5 and the holding flange 5a are integrally made of, for example, molded plastic. The peripheral edge of the center opening 16 of the lens holder 14 is a conical surface 18 having a center axis identical to the design optical axis 0. The outer peripheral edge of holding flange 5a of the objective lens 5 comes into contact with conical surface 18.

Lens holder 14 has a pair of suspension wires 19 on each side face thereof, so that the lens holder 14 is supported by a supporting wall 20 formed on the carriage 3 through a cantilever support defined by the suspension wires 19. Suspension wires 19 can be elastically deformed in the vertical direction (i.e., in the direction of thickness of the optical disc) and in the horizontal direction (i.e., in the radial direction of the optical disc) about the connecting points of the suspension wires 19 and the supporting wall 20. Consequently, lens holder 14 can be moved in the vertical and horizontal directions, due to the deformation of the suspension wires 19.

Lens holder 14 is provided on its side faces with a focus driving coil 21 wound in the horizontal direction and radial driving coils 22 wound in the vertical direction. The radial driving coils 22 are wound on opposite sides of the lens holder 14.

A pair of reflection type photosensors in the illustrated embodiment are provided on the right and left sides of lens holder 14 to detect the position of the same.

When electrical power is supplied to the focus driving coil 21, lens holder 14, which holds objective lens 5, is substantially uniformly moved in the vertical direction by the magnetic field of the yoke assembly to adjust the vertical position and, accordingly, the focus of the objective lens 5 with respect to the optical disc.

Similarly, when electrical power is supplied to the radial driving coils 22, lens holder 14 is substantially uniformly moved in the horizontal direction by the magnetic field of the yoke assembly, in order to effect a fine adjustment of the position of the objective lens in the radial direction (i.e., the tracking direction).

Note that the "vertical" and "horizontal" directions referred to herein define t% directions perpendicular to and parallel with the plane of the optical disc, respectively.

Figure 1:
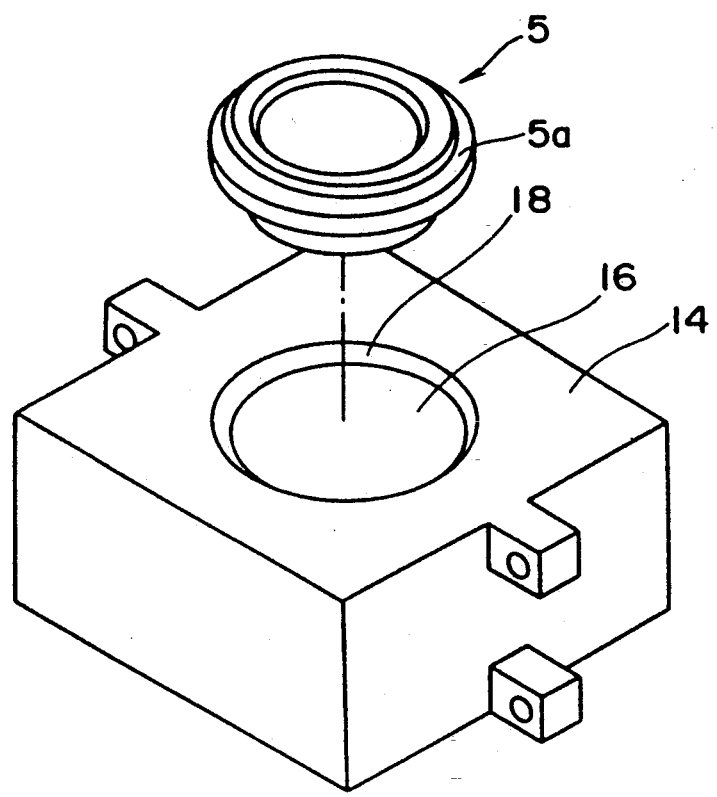
FIG. 1 is a perspective view of a main part of a carriage (i.e., an optical head) according to a first embodiment of the present invention.
Figure 2:
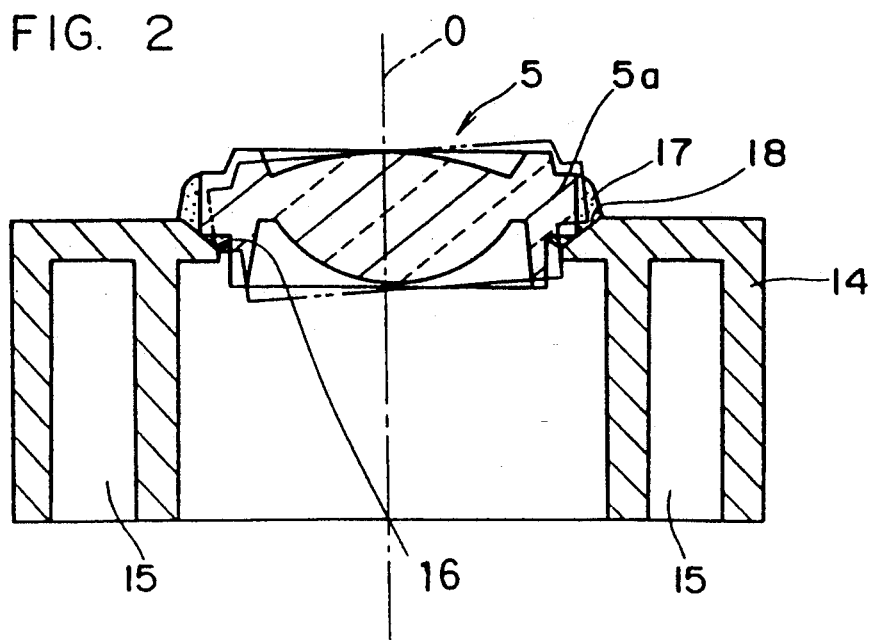
FIG. 2 is a sectional view of a main part of the carriage shown in FIG. 1.

Upon assembly of the objective lens 5, since the outer peripheral edge of the holding flange 5a of the objective lens 5 bears against the conical surface 18 of the opening 16 of the lens holder 14, as mentioned above, the inclination of the optical axis of the objective lens 5 can be optionally adjusted by slightly displacing the outer peripheral edge of the holding flange 5a on the conical surface 18 of the opening 16, as shown by the imaginary line in FIG. 2. Therefore, if fine adjustment of the optical axis is effected when the objective lens 5 is secured to the lens holder 14, it is possible to align the optical axis of the objective lens 5, regardless of any possible manufacturing error or inaccuracy in the objective lens 5 or the lens holder 14, or other component.

Consequently, it is not necessary to provide an additional complex optical axis adjusting or aligning mechanism on the carriage 3.

Figure 7:
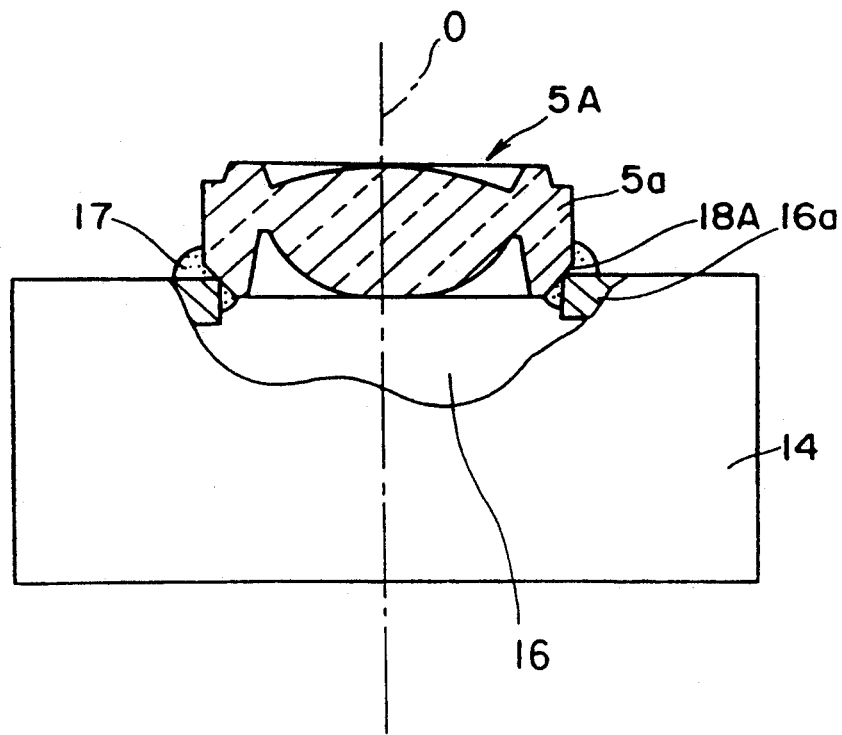
FIG. 7 is a cut-away view of a main part of a carriage according to another embodiment of the present invention.

FIG. 7 shows another embodiment of the present invention, in which like elements are designated by the same reference numerals as those in the first embodiment illustrated in FIGS. 1 through 6.

In the second embodiment, as shown in FIG. 7, the holding flange 5a of the objective lens 5A is provided with a conical surface 18A having a center axis coincident with the design optical axis 0. Center opening 16 of the lens holder 14 has a vertical inner peripheral surface 16a parallel to the optical axis 0. The conical surface 18A of the holding flange 5a comes into contact with the corner edge of the vertical inner peripheral surface 16a of the lens holder 14.

In the modified construction shown in FIG. 7, the optical axis of the objective lens can be easily adjusted with respect to the lens holder and the carriage by a slight movement of the conical surface 18A of the holding flange 5a on the vertical inner peripheral surface 16a of the lens holder 14.

It should be understood that the conical surface 18 (FIG. 2) or 18A (FIG. 7) can be replaced with a part of a spherical surface having a center axis coincident with the design optical axis 0.

As can be seen from the above discussion, according to the present invention, since at least one of either the outer peripheral surface of the objective lens or the inner peripheral edge of the opening of the lens holder (carriage) is conical or spherical, so that the objective lens is movable relative to the lens holder, through the conical or spherical contact, slight movement of the objective lens with respect to the lens holder (carriage) makes it possible to easily adjust the optical axis of the objective lens with respect to the design optical axis of the carriage without providing a special driving mechanism on the actuator to effect the fine adjustment. Therefore, a simple, small and light optical disc apparatus can be realized.

We claim:

1. An optical data recording and reproducing apparatus comprising:
   an objective lens for converging light onto an optical disc; and,
   a lens holder which supports the objective lens and which has a circular opening and a lens holding surface provided on a periphery of the circular opening;
   wherein one of either the objective lens or the lens holding surface of the lens holder is provided with a symmetrically tapered surface which is adapted to contact the other of either the lens holding surface or objective lens, respectively.

2. An optical data recording and reproducing apparatus according to claim 1, wherein said tapered surface is provided on the outer peripheral surface of the lens holder.

3. An optical data recording and reproducing apparatus according to claim 2, wherein said objective lens is provided with an annular flange which is adapted to contact the tapered surface of the lens holder.

4. An optical data recording and reproducing apparatus according to claim 1, wherein said tapered surface is provided on the objective lens, and is adapted to come into contact with the peripheral edge of the circular opening of the lens holder.

5. An optical data recording and reproducing apparatus according to claim 4, wherein said tapered surface is conical or spherical.

6. An optical data recording and reproducing apparatus according to claim 1, wherein said objective lens is secured to the lens holding surface of the lens holder after the optical axis of the objective lens has been adjusted by positioning the tapered surface at a desired position.

7. An optical data recording and reproducing apparatus comprising:
   an objective lens for converging light onto an optical disc; and
   a lens holder which supports the objective lens and which has a circular opening and a lens holding surface provided on a periphery of the circular opening;
   wherein said objective lens or said lens holding surface of the lens holder is provided with a conical or spherical surface for adjusting the axial position of the objective lens with respect to the lens holder.

8. An optical data recording and reproducing apparatus comprising a carriage which is movable across data recording tracks formed on an optical disc in a circumferential direction thereof, wherein the carriage supports an objective lens to converge light onto the optical disc to form an image, and wherein at least one of either an outer peripheral surface of the objective lens or an inner peripheral edge of a circular opening formed in the carriage is conical or spherical, wherein the other of either an inner peripheral edge of the circular opening or the outer peripheral surface of the objective lens is adapted to come into contact with the conical or spherical surface, respectively.

9. An optical data recording and reproducing apparatus comprising;
   an objective lens which converges light onto an optical disc;
   a lens holder which has an opening in which the objective lens is held;
   connecting means for connecting the objective lens to the opening of the lens holder; and
   adjusting means for adjusting the position of the objective lens with respect to the lens holder, wherein said adjusting means comprises a tapered surface provided on at least one of the objective lens and the opening of the lens holder.

10. An optical data recording and reproducing apparatus according to claim 9, wherein said connecting means comprises an adhesive for securing the objective lens to the opening of the lens holder.

11. An optical data recording and reproducing apparatus according to claim 10, wherein said tapered surface is provided on a periphery of the opening of the lens holder.

12. An optical data recording and reproducing apparatus according to claim 11, wherein a periphery of said objective lens is adapted to come into contact with the tapered periphery of the opening of the lens holder.

13. An optical data recording and reproducing apparatus according to claim 12, wherein said objective lens is provided on the outer peripheral surface thereof with an annular flange which is adapted to come into contact with the tapered periphery of the opening of the lens holder.

14. An optical data recording and reproducing apparatus according to claim 10, wherein said tapered surface is provided on a periphery of the objective lens.

15. An optical data recording and reproducing apparatus according to claim 14, wherein an edge at said opening of the lens holder is adapted to come into contact with the tapered periphery of the objective lens.

16. An optical data recording and reproducing apparatus according to claim 9, further comprising a movable carriage on which the objective lens and the lens holder are supported.

* * * * *